(12) United States Patent
Otsuka

(10) Patent No.: US 8,113,717 B2
(45) Date of Patent: Feb. 14, 2012

(54) ROLLING BEARING

(75) Inventor: Katsunori Otsuka, Kashiwara (JP)

(73) Assignee: JTEKT Corporation, Osaka (JP)

( * ) Notice: Subject to any disclaimer, the term of this patent is extended or adjusted under 35 U.S.C. 154(b) by 585 days.

(21) Appl. No.: 12/289,784

(22) Filed: Nov. 4, 2008

(65) Prior Publication Data

US 2009/0123100 A1 May 14, 2009

(30) Foreign Application Priority Data

Nov. 14, 2007 (JP) .................................. P2007-295631

(51) Int. Cl.
*F16C 33/62* (2006.01)
*F16C 33/66* (2006.01)

(52) U.S. Cl. ......... 384/463; 384/492; 384/569; 384/625
(58) Field of Classification Search .................. 384/463, 384/470, 492, 527, 622–623, 625, 907, 913, 384/569
See application file for complete search history.

(56) References Cited

U.S. PATENT DOCUMENTS

| | | | | |
|---|---|---|---|---|
| 5,066,145 A | * | 11/1991 | Sibley et al. | 384/463 |
| 5,112,146 A | * | 5/1992 | Stangeland | 384/492 |
| 5,356,227 A | * | 10/1994 | Sibley et al. | 384/463 |
| 5,513,918 A | * | 5/1996 | Wan | 384/477 |
| 5,520,467 A | * | 5/1996 | Nojima et al. | 384/470 |
| 5,860,747 A | * | 1/1999 | Wan et al. | 384/463 |
| 5,988,891 A | * | 11/1999 | Yamamoto et al. | 384/463 |
| 6,203,207 B1 | * | 3/2001 | Yamamoto et al. | 384/492 |
| 6,471,410 B1 | * | 10/2002 | Jacobson et al. | 384/907 |
| 6,726,367 B2 | * | 4/2004 | Yamamoto et al. | 384/463 |
| 7,178,986 B2 | * | 2/2007 | Ohtsuki et al. | 384/470 |
| 2002/0191878 A1 | * | 12/2002 | Ueda et al. | 384/492 |
| 2006/0210208 A1 | * | 9/2006 | Ota et al. | 384/527 |

FOREIGN PATENT DOCUMENTS

| | | | |
|---|---|---|---|
| JP | 62-46018 | * | 2/1987 |
| JP | 1-210618 | * | 8/1989 |
| JP | 7-84085 | * | 3/1995 |
| JP | 08232961 A | * | 9/1996 |
| JP | 9-42296 | | 10/1997 |
| JP | 11-190335 | * | 7/1999 |
| JP | 2000009147 A | * | 1/2000 |
| JP | 2000-35043 | * | 2/2000 |
| JP | 2001-87361 | | 4/2001 |
| JP | 2002-327756 | * | 11/2002 |
| JP | 2005-69439 | * | 3/2005 |
| JP | 2005-97401 | * | 4/2005 |
| JP | 2005188651 A | * | 7/2005 |
| JP | 2006-46432 | * | 2/2006 |
| JP | 2006-105222 | * | 4/2006 |

* cited by examiner

*Primary Examiner* — Marcus Charles
(74) *Attorney, Agent, or Firm* — McGinn IP Law Group, PLLC

(57) ABSTRACT

Surfaces of the raceway grooves of the outer and inner rings, a surface of each ball and all surface of the cage are coated with titanium oxide. In other words, hydrophilic layers made of titanium oxide are formed on the surfaces of the raceway grooves of the outer and inner rings, the surface of each ball and all surface of the cage.

14 Claims, 3 Drawing Sheets

ROLLING BEARING

BACKGROUND OF THE INVENTION

1. Field of the Invention

The present invention relates to a rolling bearing. More particularly, the present invention relates to a rolling bearing used in an environment in which water, steam or chemical fluid containing water is scattering. Especially, the present invention relates to a rolling bearing preferably used for a liquid crystal device or a washing device.

2. Related Art

Conventionally, in the case where the rolling bearing is used in an environment in which water or liquid containing water is scattering, it is used under the condition of no lubrication or alternatively it is used being lubricated by solid lubricant.

However, it is clear that the rolling bearing is used under the condition of no lubrication. Even in the case where the rolling bearing is lubricated by solid lubricant, since the solid lubricant functions as lubricant when it is abraded. Therefore, when all the solid lubricant has been abraded, the lubricating function is lost. See, for example, JP-A-9-42296.

SUMMARY OF THE INVENTION

An object of the present invention is to provide a rolling bearing capable of being positively lubricated over a long period of time in an environment in which water, steam or chemical fluid containing water is scattering.

In order to accomplish the above object, a rolling bearing of the present invention comprises: a bearing ring; a rolling element; and a cage, wherein at least one of the raceway surface of the bearing ring, the rolling contact surface of the rolling element and the guide face of the pocket of the cage for guiding the rolling element has a hydrophilic layer made of material having a hydrophilic property, and lubrication is made with water retained by the hydrophilic layer.

Examples of the material having the hydrophilic property are: titanium oxide, material containing titanium oxide, polyoxysilyl compound and material having a hydroxyl group such as polypropylene.

According to the present invention, at least one of the raceway surface of the bearing ring, the rolling contact surface of the rolling element and the guide face of the pocket of the cage has a hydrophilic layer made of material having a hydrophilic property. Therefore, it is possible to retain scattering water by this hydrophilic layer. Accordingly, it is possible to lubricate the rolling bearing by the thus retained water.

Accordingly, when this rolling bearing is used in an environment in which water, steam or chemical fluid containing water is scattering, the hydrophilic layer and a portion, which comes into sliding contact with the hydrophilic layer, can be always lubricated by water. Therefore, the hydrophilic layer and the portion, which comes into sliding contact with the hydrophilic layer, can be put into an excellent lubricating condition at all times while the rolling bearing is being used.

In the case of a constitution in which titanium oxide or material containing titanium oxide is used as hydrophilic material and further no sealing member is provided in the rolling bearing, that is, in an environment in which the sunlight and ultraviolet rays can intrude into the rolling bearing, the contamination attached to the hydrophilic layer can be dissolved into carbon dioxide by the photocatalystic action of titanium oxide. Accordingly, the hydrophilic layer can be washed and maintained in a clean condition.

In one embodiment, no hydrophilic layer is provided in a portion of the raceway surface of the bearing ring and the rolling contact surface of the rolling element. This portion has a solid lubricating layer made of solid lubricant.

According to the above embodiment, no hydrophilic layer is provided in a portion of the raceway surface of the bearing ring and the rolling contact surface of the rolling element. This portion has a solid lubricating layer made of solid lubricant. Therefore, until the solid lubricant is abraded away, all the raceway surface of the bearing ring and the rolling contact surface of the rolling element can be lubricated in a good condition.

In one embodiment, the cage is made of material added with solid lubricant or made of fluororesin having a lubrication property.

According to the above embodiment, by the synergistic effect of the lubricating actions of the hydrophilic layer and the cage, the lubricating property can be greatly enhanced beyond estimation as compared with a rolling bearing, the cage of which is made of material to which the solid lubricant is added, or material of fluororesin having a lubricating property.

According to the rolling element of the present invention, the hydrophilic layer and the portion, which comes into sliding contact with the hydrophilic layer, can be always lubricated by water. Therefore, the hydrophilic layer and the portion, which comes into sliding contact with the hydrophilic layer, can be put into an excellent lubricating condition at all times while the rolling bearing is being used.

DETAILED DESCRIPTION OF THE PREFERRED EMBODIMENTS

Figure 1:
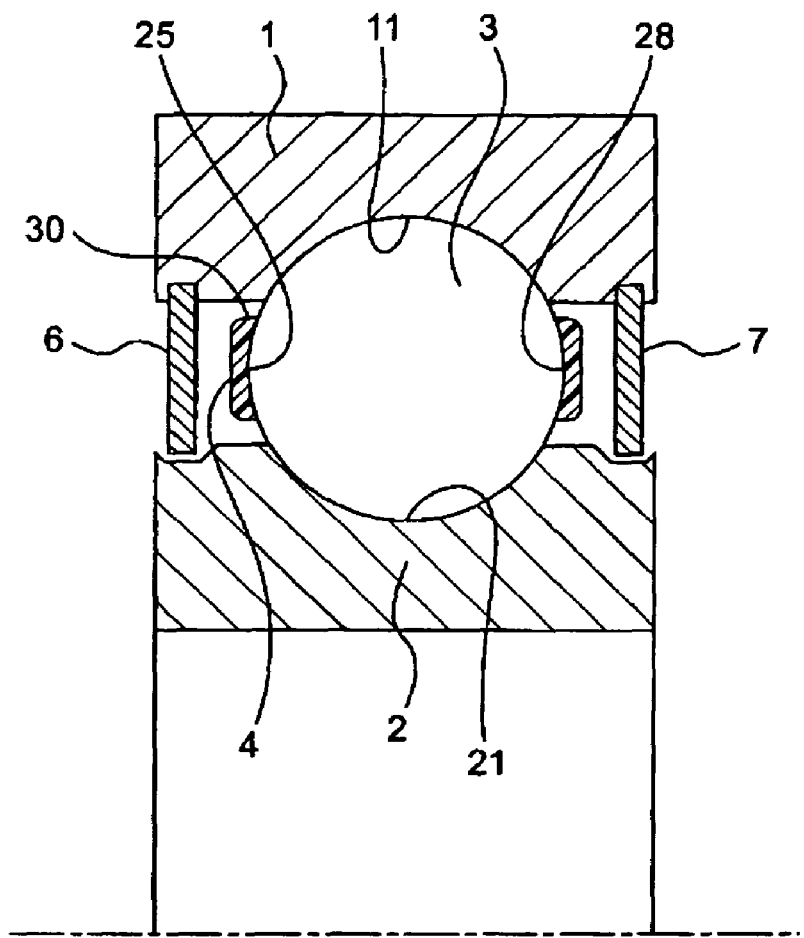
FIG. 1 is a schematic sectional view showing a ball bearing of the first embodiment of the present invention.

An embodiment of the present invention will be explained in detail, referring to the drawings.

FIG. 1 is a schematic sectional view in the axial direction of a ball bearing which is the first embodiment of the rolling bearing of the present invention.

This ball bearing pivotally supports a drive shaft of a liquid crystal device and is installed in an environment in which water is being scattered outside the ball bearing.

This ball bearing includes: an outer ring 1 which is a bearing ring; an inner ring 2 which is a bearing ring; a plurality of balls 3 which are rolling elements; a cage 4 for holding the balls 3; a first shielding plate 6; and a second shielding plate 7.

The outer ring 1 includes: a raceway groove 11 which is formed on an inner circumferential face of the outer ring 1 and used as a raceway surface; a first shielding plate attaching groove, the shape of which is annular; and a second shielding plate attaching groove, the shape of which is annular. The raceway groove 11 is located in a central portion in the axial direction on the inner circumferential face. The first shielding plate attaching groove is located in one end portion in the axial direction on the inner circumferential face. The second shielding plate attaching groove is located in the other end portion in the axial direction on the inner circumferential face.

The inner ring 2 includes a raceway groove 21 which is a raceway surface and formed in a central portion on the outer circumferential face.

The plurality of balls 3 are arranged between the raceway groove 11 of the outer ring 1 and the raceway groove 21 of the inner ring 2 in the circumferential direction at regular intervals being held by the cage 4. The cage 4 is made of PEEK resin (polyether etherketon) or PPS resin (polyphenylene sulfide). The cage 4 includes a pocket 25 for accommodating the balls 3. The balls 3 are guided by the ball guide face 28 of the pocket 25.

The first shielding plate 6 airtightly closes one opening in the axial direction between the outer ring 1 and the inner ring 2. One end portion outward in the radial direction of the first shielding plate 6 is fixed into the first shielding plate attaching groove. On the other hand, the other end portion inward in the radial direction is opposed to the outer circumferential face of the inner ring 2 while leaving a small gap in the radial direction. The other end portion inward in the radial direction of the first shielding plate 6 and a portion on the outer circumferential face of the inner ring 2, which is opposed to this other end portion in the radial direction, form a labyrinth seal.

The second shielding plate 7 airtightly closes one opening in the axial direction between the outer ring 1 and the inner ring 2. One end portion outward in the radial direction of the second shielding plate 7 is fixed into the second shielding plate attaching groove. On the other hand, the other end portion inward in the radial direction is opposed to the outer circumferential face of the inner ring 2 while leaving a small gap in the radial direction. The other end portion inward in the radial direction of the second shielding plate 7 and a portion on the outer circumferential face of the inner ring 2, which is opposed to this other end portion in the radial direction, form a labyrinth seal. Inside the ball bearing, water, which has passed through the labyrinth seal, are scattering at the time of using the ball bearing.

The raceway groove 11 of the outer ring 1, the raceway groove 21 of the inner ring 2, the surface (the rolling contact surface) of each ball 3 and all the surface of the cage 4 are coated with titanium oxide which is an example of the hydrophilic material. In other words, the surfaces of the raceway groove 11 of the outer ring 1, the raceway groove 21 of the inner ring 1, each ball 3 and cage 4 have hydrophilic layers (not shown) made of titanium oxide.

According to the ball bearing of the first embodiment described above, the raceway grooves 11, 21 of the inner and outer rings 1, 2, the surfaces of the balls 3 (the rolling contact surfaces) and the ball guide face 28 of the pocket 25 of the cage 4 have hydrophilic layers made of titanium oxide having a hydrophilic property. At the time of using the ball bearing, water is scattering in the ball bearing. Therefore, it is possible to retain the scattering water by this hydrophilic layer. By the thus retained water, it is possible to lubricate the raceway grooves 11, 21 of the inner and outer rings 1, 2, the surfaces of the balls 3 (the rolling contact surfaces) and the ball guide face 28 of the pocket 25 of the cage 4. Therefore, seizure of the sliding portion can be positively prevented over a long period of time.

In the ball bearing of the first embodiment described above, titanium oxide is used as material having a hydrophilic property. However, in the present invention, it is possible to use a compound material containing titanium oxide, polyoxysilyl compound and material having a hydroxyl group such as polypropylene as hydrophilic material. In this rolling bearing, as long as the material is hydrophilic, any material may be used.

According to the ball bearing of the first embodiment described above, the raceway grooves 11, 21 of the inner and outer rings 1, 2, the rolling contact surfaces of the balls 3 and all the surface of the cage 4 are coated with titanium oxide which is an example of the hydrophilic material. However, in the present invention, at least one of the raceway surface of the bearing ring, the rolling contact surface of the rolling element and the guide surface of the pocket of the cage for guiding the rolling element may be coated with titanium oxide. In this case, the lubricating property of at least one of the raceway surface of the bearing ring, the rolling contact surface of the rolling element and the guide surface of the pocket of the cage for guiding the rolling element, which are coated with hydrophilic material, can be made excellent over a long period of time.

In the ball bearing of the first embodiment described above, the rolling element is the ball 3. However, in the present invention, the rolling element may be a cylindrical roller, a tapered roller or a spherical roller, that is, the rolling element may be a rolling element except for a ball.

In the ball bearing of the first embodiment described above, the shielding plates 6, 7 are arranged on both sides in the axial direction between the outer ring 1 and the inner ring 2, that is, one shielding plate is arranged on each side. However, in the present invention, the seal device is not limited to the shielding plate but the seal device may be a seal device having a sliding contact lip formed out of a core bar and an elastic portion. In the present invention, the seal device is not limited to the outer ring fixing type described in the present embodiment but the seal device may be of the inner ring fixing type. The seal member may be arranged only on one side in the axial direction between the outer ring and the inner ring. A portion between the inner and the outer ring may not be airtightly closed by the seal device.

In this connection, in the case where the seal device is arranged only on one side in the axial direction between the outer and the inner ring and in the case where no seal device is provided between the outer and the inner ring, titanium oxide is employed as hydrophilic material. Further, in the case of an environment in which the sunlight or ultraviolet rays intrude into between the inner and the outer ring, the contamination attached to the hydrophilic layer can be dissolved into carbon dioxide by the photocatalystic action of titanium oxide. Accordingly, in this case, the hydrophilic layer can be washed and maintained in a clean condition.

In the ball bearing of the first embodiment, all the surface of the cage 4 is coated with hydrophilic material. Further, in the ball bearing of the first embodiment, as shown in FIG. 1, at the time of using the ball bearing, the cage 4 is located leaving an interval with respect to the outer ring 1 and the inner ring 2. Therefore, an end face outward in the radial direction of the cage 4, which is shown by the reference numeral 30 in FIG. 1, that is, a portion not coming into sliding contact with other members is not necessarily coated with hydrophilic material. However, when all the surface of the cage is coated with hydrophilic material, it is possible to execute coating simply and quickly as compared with a case in which a portion of the surface of the cage is coated with hydrophilic material. For example, in the case of a rolling bearing, in which the cage comes into slide contact with a circumferential face of the bearing ring, such as a rolling bearing in which the cage is guided by a raceway shoulder portion of the outer ring or the inner ring, when all the surface of the cage is coated with hydrophilic material, it is possible to prevent the seizure of the cage and the circumferential surface of the inner ring or the outer ring by which the cage is guided.

In the present embodiment, the ball bearing of the present invention is mounted on a drive shaft of a liquid crystal device. However, the rolling bearing of the present invention can be mounted on not only the liquid crystal device but also any device such as a washing device used in an environment in which water, steam or chemical fluid containing water is scattering outside the bearing.

Figure 2:
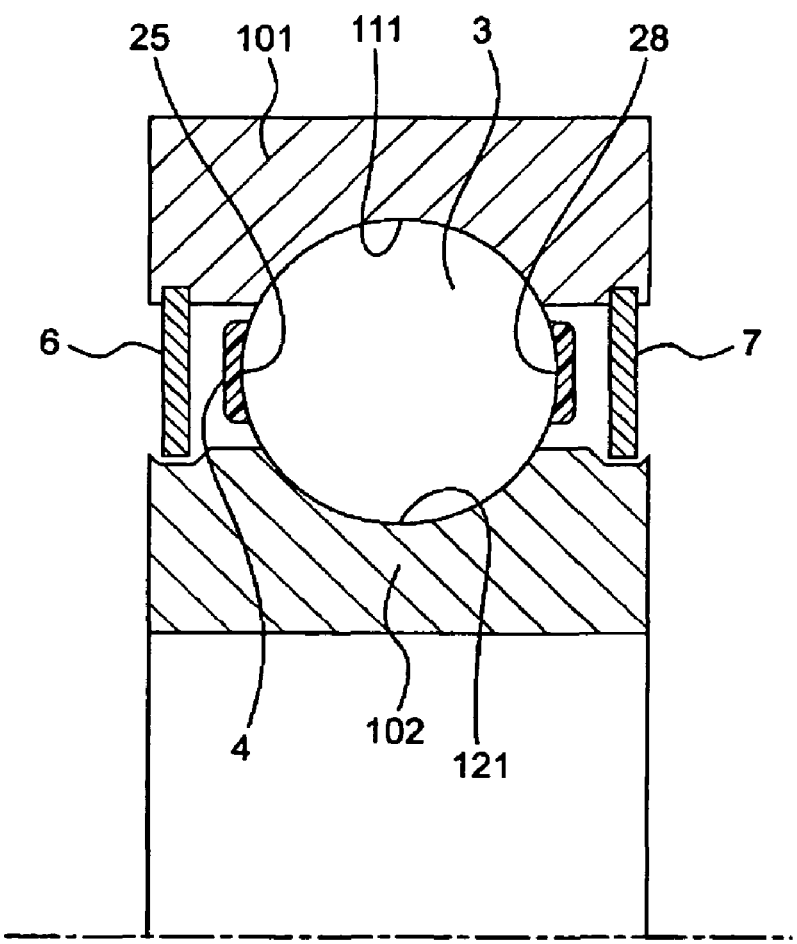
FIG. 2 is a schematic sectional view showing a ball bearing of the second embodiment of the present invention.

FIG. 2 is a schematic sectional view in the axial direction of a ball bearing which is the second embodiment of the rolling bearing of the present invention.

Like reference numerals are used to indicate like components in the ball bearings of the first and the second embodiment and the duplicate explanations are omitted here. In the ball bearing of the second embodiment, concerning the same operational effects as those of the ball bearing of the first embodiment and concerning the variation, the explanations are omitted here. Only the constitution and the operational effects different from those of the ball bearing of the first embodiment and the variation will be explained here.

This ball bearing of the second embodiment is different from that of the first embodiment as follows. The raceway groove 111 of the outer ring 101 and the raceway groove 121 of the inner ring 102 are not coated with hydrophilic material such as titanium oxide but coated with solid lubricant. The other constitution is the same as that of the ball bearing of the first embodiment.

Examples of the above solid lubricant are: graphite, graphite fluoride, carbon fluoride, hexagonal boron nitride, mica fluoride, gold, silver, lead, magnesium, tungsten disulfide, molybdenum disulfide, graphite, tetrafluoride ethylene, Teflon, PFA, $MoS_2$, $WS_2$ and mixtures of them.

According to the ball bearing of the second embodiment described above, the raceway grooves 111, 121 of the inner and outer rings 101, 102 and a portion not having a hydrophilic layer of the rolling contact surface of the ball 3, that is, the raceway grooves 111, 121 of the inner and outer rings 101, 102 are coated with solid lubricant and the raceway grooves 111, 121 of the inner and outer rings 101, 102 have layers made of solid lubricant. Therefore, the raceway grooves 111, 121 of the inner and outer rings 101, 102 and the rolling contact surfaces of the balls 3 can be excellently lubricated.

In the ball bearing of the second embodiment described above, the rolling contact surface of the ball 3 and the ball guide surface 28 of the pocket of the cage 4 are coated with titanium oxide having a hydrophilic property. On the other hand, the raceway grooves 111, 121 of the inner and outer rings 101, 102 and a portion not having a hydrophilic property of the rolling contact surface of the ball 3, that is, the raceway grooves 111, 121 of the inner and outer rings 101, 102 are coated with the solid lubricant.

However, in the present invention, at least one of the raceway grooves of the inner and outer ring, the rolling contact surface of the ball and the guide surface of the pocket of the cage may be coated with a hydrophilic material. (A case in which only the raceway grooves of the inner and outer rings are coated with hydrophilic material is excluded and a case in which all are coated with hydrophilic material is also excluded.) At the same time, members not coated with hydrophilic material in the raceway grooves of the inner and outer rings and the rolling contact face of the ball may be coated with solid lubricant.

In the present invention, at least one of the raceway grooves of the inner and outer ring, the rolling contact surface of the ball and the guide surface of the pocket of the cage may be coated with a hydrophilic material. (A case in which only the raceway grooves of the inner and outer rings are coated with hydrophilic material is excluded and a case in which all are coated with hydrophilic material is also excluded.) At the same time, members not coated with hydrophilic material in the raceway grooves of the inner and outer rings, the rolling contact face of the ball and the ball guide face of the pocket of the cage may be coated with solid lubricant. Due to the foregoing, all of the raceway grooves of the inner and outer ring, the rolling contact surface of the ball and the guide surface of the pocket of the cage can be preferably lubricated.

Figure 3:
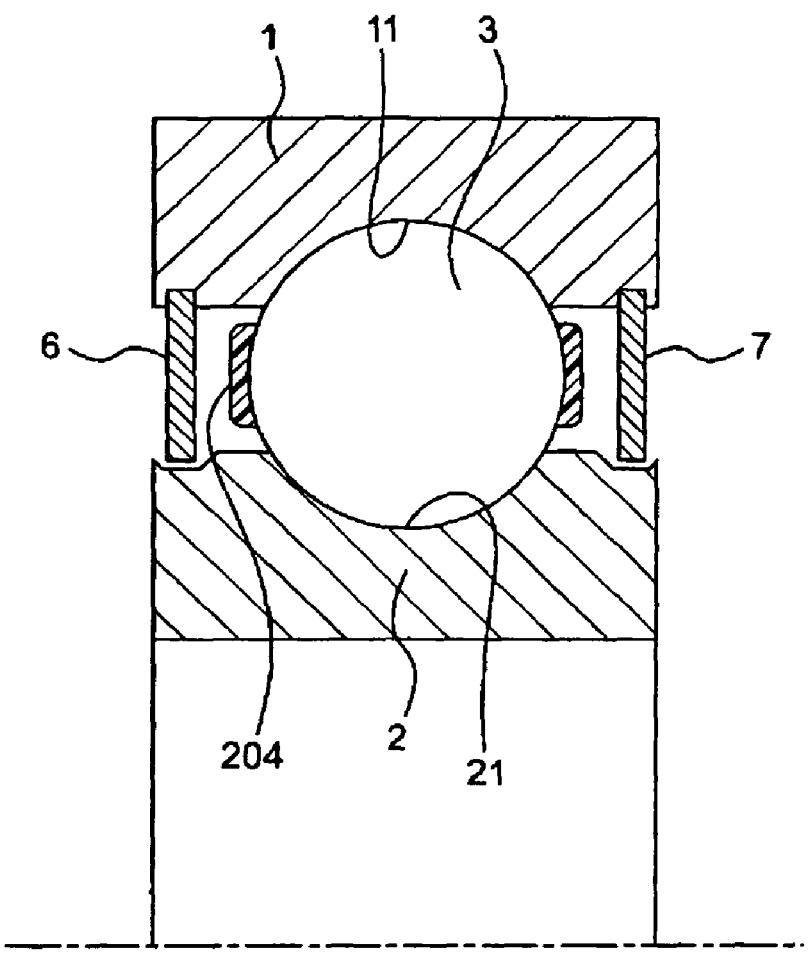
FIG. 3 is a schematic sectional view showing a ball bearing of the third embodiment of the present invention.

FIG. 3 is a schematic sectional view in the axial direction of a ball bearing which is the third embodiment of the rolling bearing of the present invention.

Like reference numerals are used to indicate like components in the ball bearings of the first and the third embodiment and the duplicate explanations are omitted here. In the ball bearing of the third embodiment, concerning the same operational effects as those of the ball bearing of the first embodiment and concerning the variation, the explanations are omitted here. Only the constitution and the operational effects different from those of the ball bearing of the first embodiment and the variation will be explained here.

The ball bearing of the third embodiment is different from that of the first embodiment as follows. In ball bearing of the third embodiment, a surface of the cage 204 is not coated with hydrophilic material. On the other hand, the ball bearing of the third embodiment employs a cage 204 made of material to which solid lubricant is added or alternatively the ball bearing of the third embodiment employs a cage 204 made of fluororesin having a lubricating property.

In this case, examples of the material to which the solid lubricant is added are: polyamide, polyimide and phenol resin containing the solid lubricant such as molybdenum disulfide enumerated in the second embodiment.

Examples of the fluororesin having a lubricating property are: tetraethlylene fluoride(polytetrafluoroethylene), teraethylene fluoride-hexapropylenefluoride copolymer (FEP), tetraethylene fluoride-perfluoroalkylvinylether copolymer resin (PFA), tetraethylene fluoride-ethylene copolymer (ETFE), trifluoride ethylenechloride (PCTFE) and vinylidene fluoride (PVDF).

According to the ball bearing of the third embodiment, the cage 204 is made of material, to which solid lubricant is added, or fluororesin having a property of lubrication. Therefore, when the ball 3 is rolled at the time of using the ball bearing, the solid lubricant or the fluororesin is transferred onto the rolling contact surface of the ball 3 or the raceway surfaces of the inner and outer rings 1, 2. Therefore, a lubricant film is formed in a portion to which the solid lubricant or the fluororesin has been transferred. By the synergistic effect generated by the lubricating actions of the hydrophilic layer and the cage, the lubrication property can be remarkably enhanced beyond estimation as compared with the rolling bearing, the cage of which is made of the material to which the solid lubricant is added or made of the fluororesin having a lubricating property.

In the third embodiment described above, the hydrophilic material is not coated on the cage at all. However, in the present invention, a portion of the surface of the cage (for example, only the rolling element guide surface of the cage) may be coated with hydrophilic material such as titanium oxide.

In this connection, of course, the present invention includes a rolling bearing in which the material of the cage is changed from PEEK resin (polyether etherketon) or PPS resin (polyphenylene sulfide) to the material to which the solid lubricant is added or to the fluororesin having a lubricating property in the rolling bearing of the first embodiment, the rolling bearing of the variation of the first embodiment, the second embodiment or the rolling bearing the variation of the second embodiment.

What is claimed is:

1. A rolling bearing comprising:
a bearing ring;
a rolling element; and
a cage,
wherein at least one of a raceway surface of the bearing ring, a rolling contact surface of the rolling element and a guide face of a pocket of the cage for guiding the rolling element comprises a hydrophilic layer comprising a material having a hydrophilic property, and
wherein lubrication is made with water retained by the hydrophilic layer.

2. The rolling bearing according to claim 1, wherein the raceway surface of the bearing ring or the rolling contact surface of the rolling element includes a portion not having the hydrophilic layer and said portion includes a solid lubrication layer comprising a solid lubricant.

3. The rolling bearing according to claim 1, wherein the cage comprises a material added with solid lubricant or comprises fluororesin having a lubrication property.

4. The rolling bearing according to claim 1, wherein at least one of the raceway surface of the bearing ring, the rolling contact surface of the rolling element and the guide face of the pocket of the cage is coated with titanium oxide.

5. The rolling bearing according to claim 1, wherein a portion of the raceway surface contacts the rolling element 6. The rolling bearing according to claim 1, wherein each of the raceway surface of the bearing ring, the rolling contact surface of the rolling element and the guide face of the pocket of the cage for guiding the rolling element comprises a hydrophilic layer.

7. The rolling bearing according to claim 1, wherein the hydrophilic layer comprises titanium oxide.

8. The rolling bearing according to claim 1, wherein an entirety of the cage includes a hydrophilic layer.

9. The rolling bearing according to claim 1, further comprising a shielding plate disposed on an axial end of the bearing ring.

10. The rolling bearing according to claim 1, wherein the cage comprises a hydrophilic layer.

11. The rolling bearing according to claim 1, wherein the rolling contact surface of the rolling element and the guide face of the pocket of the cage for guiding the rolling element comprise a hydrophilic layer.

12. The rolling bearing according to claim 1, wherein the hydrophilic layer comprises a polyoxysilyl compound.

13. The rolling bearing according to claim 1, wherein the hydrophilic layer comprises a material comprising a hydroxyl group.

14. The rolling bearing according to claim 1, wherein the hydrophilic layer comprises polypropylene.

* * * * *